United States Patent

[11] 3,578,905

| [72] | Inventors | Walter G. Anders;<br>Henry W. Kumpf, Jr., Canton, Ohio |
|------|-----------|--------------------------------------------------------|
| [21] | Appl. No. | 790,977 |
| [22] | Filed | Jan. 14, 1969 |
| [45] | Patented | May 18, 1971 |
| [73] | Assignee | Diebold, Incorporated<br>Canton, Ohio |

[54] SIGNATURE AUTHORIZATION AND VERIFICATION EQUIPMENT AND SYSTEM
23 Claims, 13 Drawing Figs.

[52] U.S. Cl.............................................. 178/6,
178/6.8, 178/7.9, 312/7
[51] Int. Cl........................................A47b 81/06,
H04n 7/18
[50] Field of Search........................... 178/6, 7.9,
6.8; 312/7 (TV)

[56] References Cited
UNITED STATES PATENTS
2,122,918  7/1938  Phinney........................ 178/19
2,294,809  9/1942  Smith........................... 178/6
3,194,880  7/1965  Weingart...................... 178/6

Primary Examiner—Bernard Konick
Assistant Examiner—Howard W. Britton
Attorney—Frease & Bishop ABSTRACT: Banking service equipment is provided to permit one of a number of bank tellers to transmit a picture of a signature on a check by closed-circuit television to a monitor for one of a number of file clerks at a bank department where signature cards are filed, so that a file clerk can compare the signatures on the check and card, verify the authenticity of the signature on the check, and actually stamp the check to signify that the signature has been verified and that a banking transaction based on the check is authorized. The stamping is accomplished by an approval stamp located at the teller station actuated by pressing a button at the file clerk station. The equipment also is provided with means for signaling the teller in event that the file clerk determines that the signatures are not believed to be the same. This system enables entire responsibility for authorization to be placed on the file clerk.

INVENTORS
Walter G. Anders
BY and Henry W. Kumpf Jr.

Frease & Bishop
ATTORNEYS

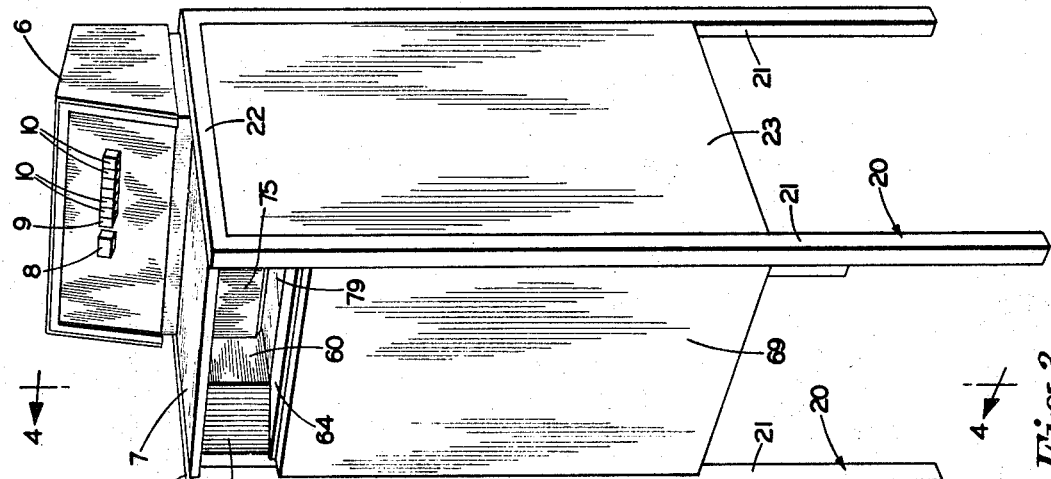
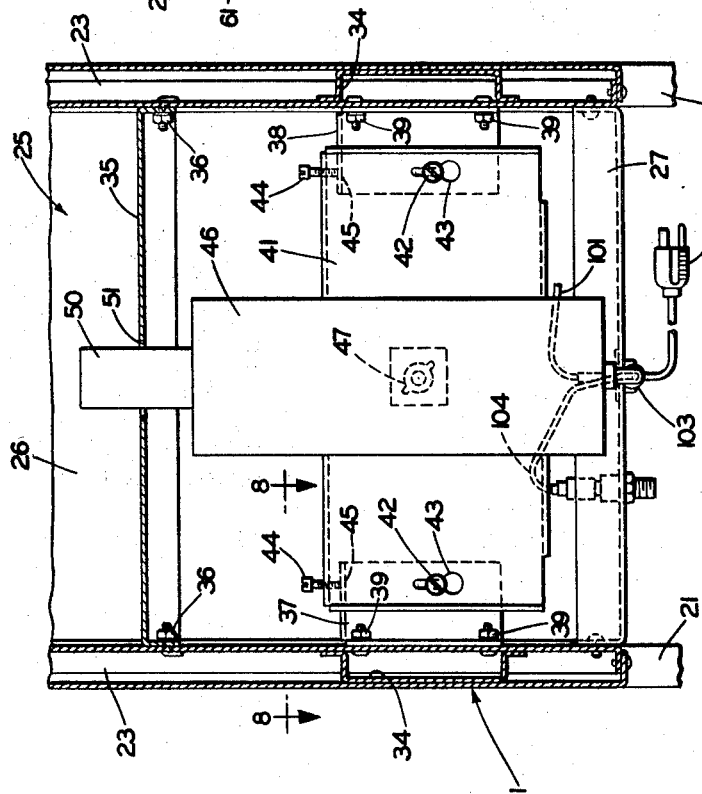
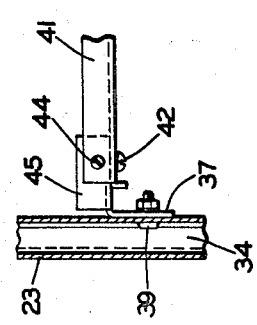
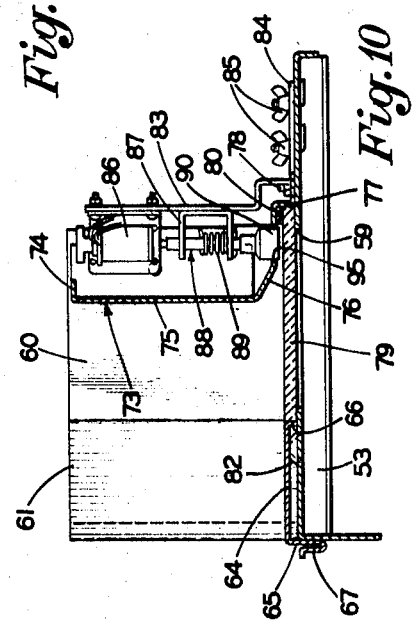

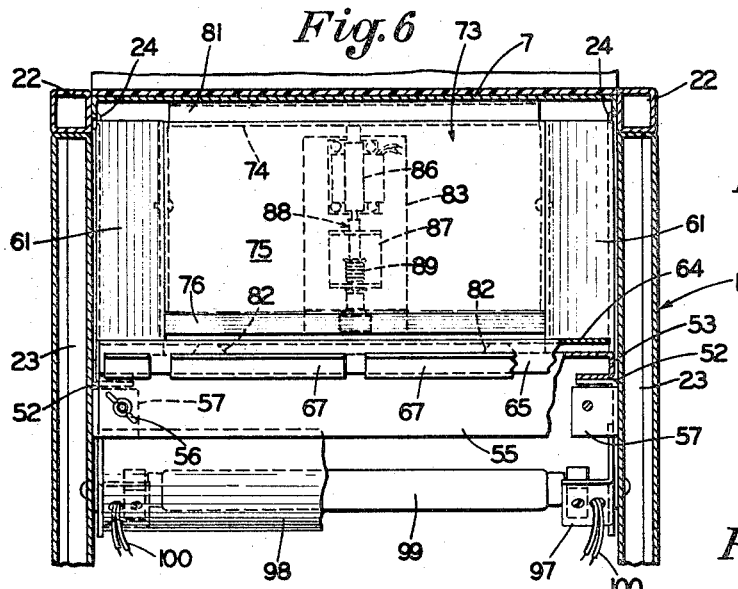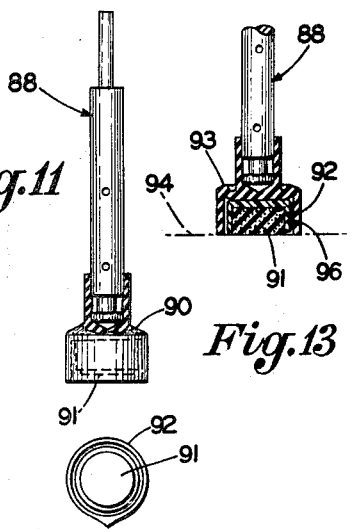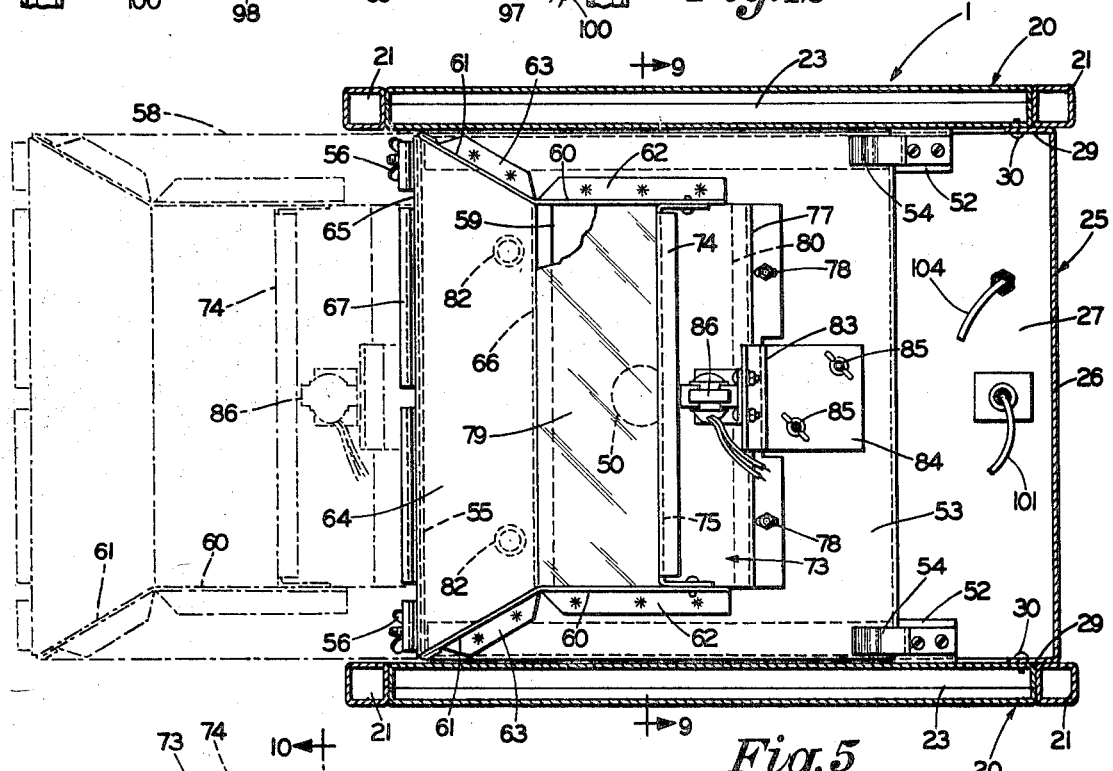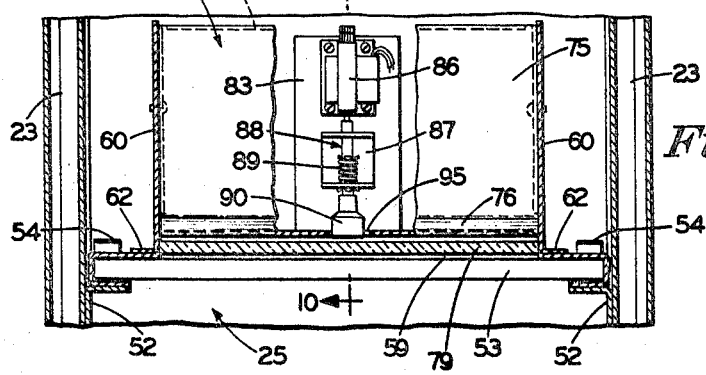

SIGNATURE AUTHORIZATION AND VERIFICATION EQUIPMENT AND SYSTEM

BACKGROUND OF THE INVENTION

1. Field of the Invention

The invention relates to equipment and systems by which signatures on checks and the like, for example, the endorsing signature of a customer who wishes to cash a check and presents the check to a teller who does not know this customer, may be compared with the known signature of the customer on file in the signature card file department of a bank. The equipment and system involve closed-circuit television components which enable a picture of the check signature to be transmitted to a file clerk who compares the check signature on file. The file clerk has full responsibility for approving or vetoing the authenticity of the check signature and actually causes the check to be stamped if approved.

The system further may involve a plurality of teller stations each with its own TV camera or transmitter and a plurality of file clerk stations each with its own TV receiver or monitor or terminal in a closed-circuit television system with provisions to connect any teller station with any file clerk station and when thus connected, the particular file clerk station involved is connected back to the particular teller station for actuation by the file clerk of an approval stamp at the teller station to stamp a check or other article being viewed at the teller station, or for actuation of a veto signal to the teller by the file clerk.

2. Description of the Prior Art

Prior devices or systems used for signature authorization and verification have involved use of a camera at a bank file clerk station for transmitting a picture of a signature card to a monitor or receiver at a teller station so that the teller to complete a banking transaction could compare the picture of a signature on a signature card with a signature on a check presented to the teller by a customer. This arrangement places the responsibility on the particular teller involved of determining the authenticity of a signature of a customer unknown to the teller.

It is desirable, however, in accordance with modern banking procedure requirements that a signature card file clerk who is skilled in signature comparisons and who works with the signature cards be charged with responsibility of either approving or vetoing the authenticity of signatures. Such procedure is not possible to be carried out with prior art equipment and systems.

Furthermore, where a file clerk rather than a teller detects a questionable signature and vetos its being relied upon, the file clerk may signal the teller who can then handle further customer contact in accordance with better public relations procedures, than where the teller detects a questionable signature through his own comparison and must proceed with the customer who may have seen the comparison procedure.

SUMMARY OF THE INVENTION

Objectives of the invention include providing a signature authorization and verification system and equipment utilizing closed-circuit television components interconnected between a plurality of teller stations and a plurality of file clerk stations so that the act of verifying a signature may be the responsibility of and accomplished by a file clerk familiar with signature comparisons and acting as a custodian of a group of signature cards, and so that the act of authorizing or vetoing the authenticity of a signature is performed by the file clerk and where approved, the approval is stamped on the article containing the approved signature by the act of the file clerk; providing a system and construction involving generally standard basic components such as standard television cameras and receivers, and including housing equipment where the cameras and approval devices are located which inhibit tampering with the approval devices for actuation by any person other than the file clerk at a remote location; and providing a construction, equipment and system achieving the stated objectives simply, effectively, compactly and inexpensively, and solving problems and satisfying existing needs in connection with the procedure of signature authorization and verification in conducting banking services.

These objectives and advantages are obtained by the equipment and system, the general nature of which may be stated as including a teller station cabinet-housed TV camera-transmitter and control unit; a file clerk station TV terminal monitor receiver and control unit; the teller station unit preferably comprising a cabinet having a top work counter, a removable platform having a transparent window within the cabinet spaced below the work counter adapted to support a document to be verified, a TV camera within the cabinet having lens means directed toward the undersurface of the transparent window, light means within the cabinet below the platform adjacent the window, adjustable mounting means for the camera, approval stamp means adjustably mounted on the platform above a portion of the window whereby a document displayed at the window and photographed by the camera may be stamped; means enclosing the approval stamp means against access through the space between the work counter and platform, and control means for the teller station unit; the teller station control means comprising a power switch, veto signal means and a series of file station selector buttons; the file station unit preferably comprising a TV monitor receiver and control means for the file station unit; the file station control means comprising a power switch, an approval button, a veto button, teller station-identifying means, audible signal means, and lock means for the approval button; preferably a plurality of teller station units and a plurality of file station units; and cable and junction box means whereby any file station unit may be connected with any teller station unit.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set for the in the appended claims.

FIG. 3 is a perspective view of a cabinet-housed TV transmitter or camera and the control means therefor located at one of the teller stations of the system;

FIG. 5 is a plan section taken on the line 5–5, FIG. 4;

FIG. 6 is a fragmentary front section of the upper part of the cabinet taken on the line 6–6, FIG. 4;

FIG. 7 is a view similar to FIG. 6 of the lower portion of the cabinet taken on the line 7–7, FIG. 4;

FIG. 8 is a fragmentary section looking in the direction of the arrows 8–8, FIG. 7;

FIG. 9 is a fragmentary section with parts broken away similar to FIG. 6 but taken on the line 9–9, FIG. 5;

FIG. 10 is a sectional view through a platform assembly removed from the cabinet taken as on the line 10–10, FIG. 9;

FIG. 11 is a fragmentary side elevation with parts broken away of the stamping component of the approval stamp device;

FIG. 12 is a bottom plan view of the stamp shown in FIG. 11; and

FIG. 13 is a view similar to a portion of FIG. 11 with parts in section illustrating the actuating position of the approval stamp.

Similar numerals refer to similar parts throughout the drawings.

DESCRIPTION OF THE PREFERRED EMBODIMENT

Figure 1:
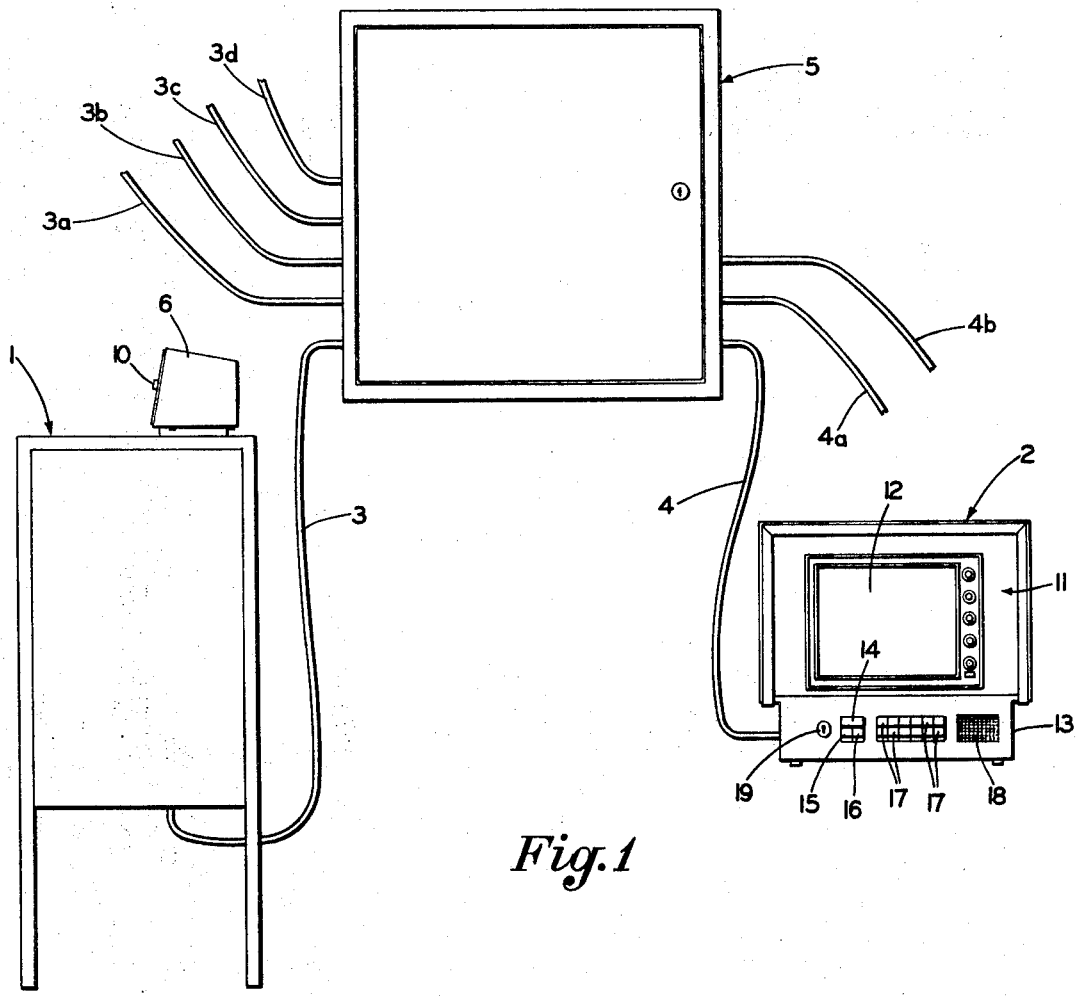
FIG. 1 is a diagrammatic view illustrating the fundamental components of the interconnections between the components of the improved system.
Figure 2:
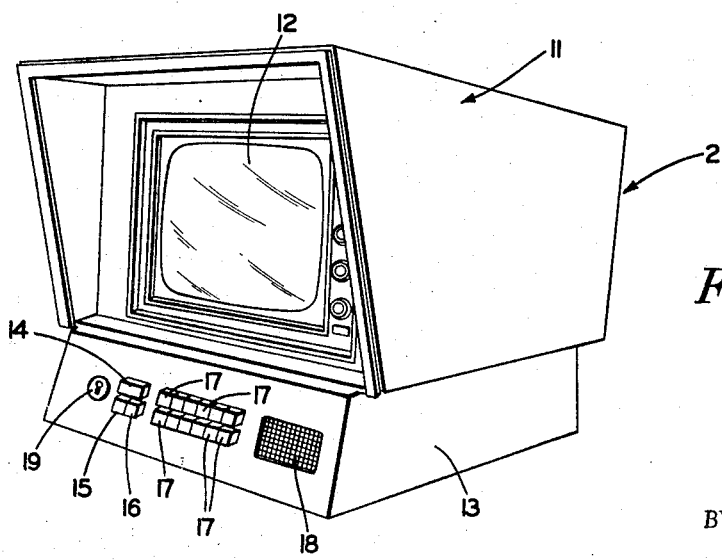
FIG. 2 is a perspective view of one of the TV receivers or monitors of the system located at a file clerk station.

The improved system is illustrated diagrammatically in FIG. 1. FIGS. 2 and 3 illustrate generally the two main components of the system. These components are a housing or cabinet 1 for a TV transmitter or camera, and a TV terminal, receiver or monitor 2. The cabinet 1 is located at a teller station and the terminal 2 is located at a file clerk station. In a system installed in a large bank, there may be many teller stations each equipped with a cabinet 1 and there may be a number of file clerk stations each equipped with a terminal 2. For example, one file clerk may be charged with responsibility concerning the file of signature cards for accounts ranging from A through G, another file clerk for accounts ranging from H through M, etc.

Where there is a plurality of teller stations equipped with cabinets 1 and a plurality of file clerk stations equipped with monitors 2, the components 1 and 2 at all stations may be interconnected by closed-circuit TV cables 3 and 4 with a through a junction box 5. Cables leading from other teller stations are indicated diagrammatically in FIG. 1 at 3a, 3b, 3c, and 3d. Cables connected with other file clerk stations are indicated in FIG. 1 at 4a and 4b. Usual switching equipment may be located in junction box 5 adapted for connecting any cabinet 1 with any terminal 2 upon actuation of a file clerk selector button at a teller station.

The control box 6 preferably mounted on the top wall 7 of cabinet 1 is equipped with a power button 8, a veto signal light 9 and a number of file clerk selector buttons 10. Each terminal or receiver 2 (FIG. 2) includes a housing generally indicated at 11 for a usual or typical standard television receiver 12 equipped with control devices housed within the housing portion 13. The various control devices may include a power button 14, an approval button 15, a veto button 16, a series of teller station indicators 17, an audible signal device 18, and a keylock 19 for the approval button 15.

Actuation of the power button 8 at cabinet 1 supplies power to the components housed within the cabinet. Actuation of one of the file clerk selector buttons 10 connects the particular teller station 1 with the selected file clerk station receiver 2 and actuates an audible signal such as a "beep," speaker, tuning fork signal, or the like, at location 18 in the unit 2 at the selected file clerk station. This signal attracts the attention of the file clerk responsible for the particular receiver 2. The clerk then energizes the receiver 2 by pressing the power button 14. Meanwhile, the particular indicator 17 for the teller station that has been connected to the receiver 2 has been lighted to indicate the identity of the particular connected teller station.

Each cabinet 1 preferably has a side frame or leg assembly at each side formed as tubular U-shaped leg members 20, each having upright portions 21, a top crossmember 22 and preferably double-walled side panels 23 joined in any suitable manner to each leg member 20 between the upright portions 21.

Figure 4:
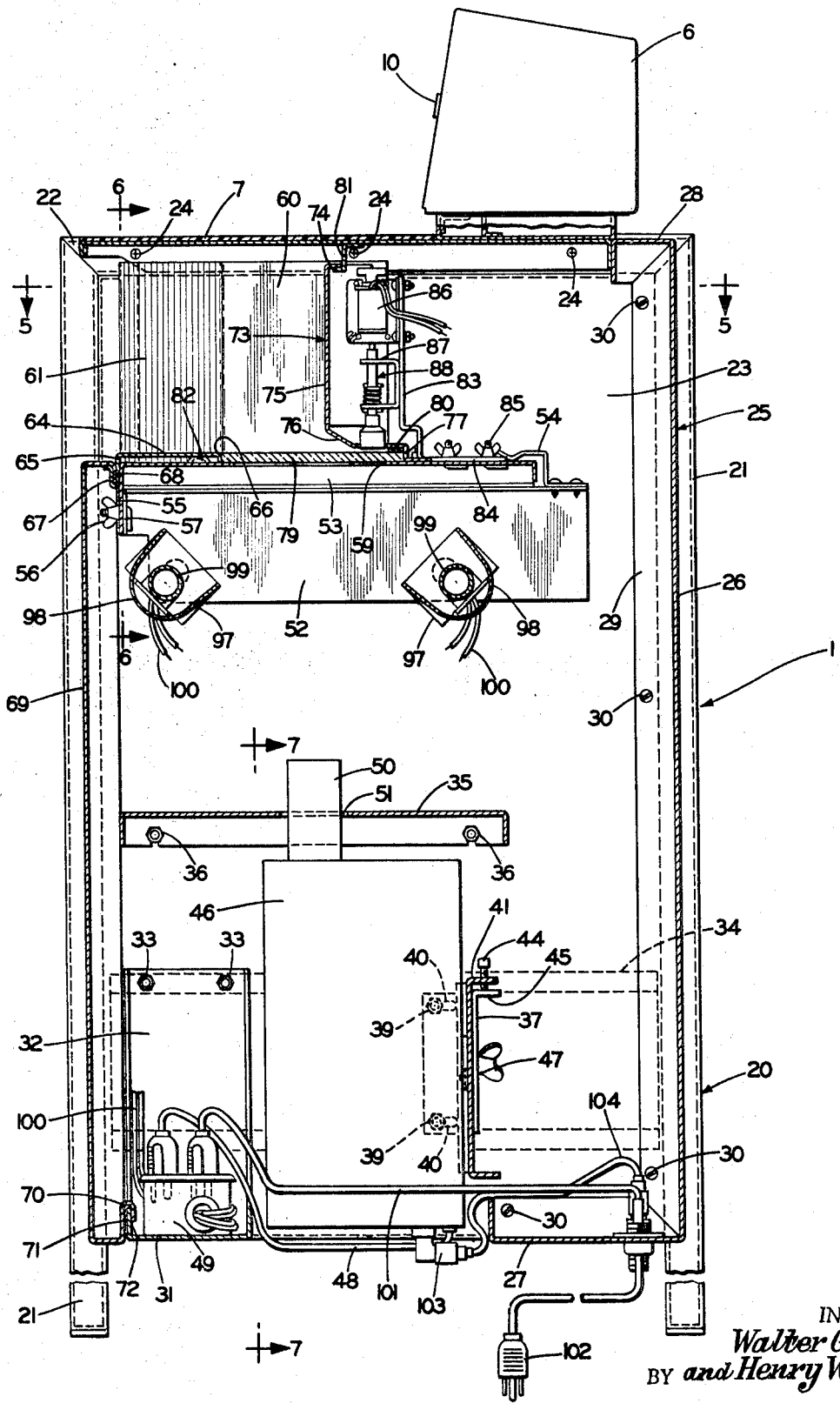
FIG. 4 is a vertical section looking in the direction of the arrows 4–4, FIGS. 3.

The cabinet top wall 7 is bolted at 24 to the spaced top crossmembers 22 of leg members 20. A U-shaped back and base member 25 having a backwall 26, a base 27, a top flange 28 and side flanges 29 is bolted at 30 to the rear upright portions 21 of leg members 20 and to the lower rear portions of side panels 23. A channel-shaped stretcher member 31 (FIG. 4), spaced forwardly of the forward edge of base portion 27 of member 25, is connected at its ends by upwardly projecting legs 32 and bolts 33 with side panels 23 (FIGS. 4 and 7). The side panels 23 are internally reinforced by channel members 34 spotwelded to the inner and outer walls of side panels 23 in the zones in which the legs 32 of stretcher member 31 are bolted to side panels 23 (FIG. 4).

A light shield or baffle plate 35 is bolted at 36 to side panels 23 (FIGS. 4 and 7) spaced above base portion 27 and stretcher member 31. A pair of angle-mounting brackets 37 and 38 are supported on side panels 23 by bolts 39, the 39 extending through horizontal slots 40 in the brackets 37 and 38 to permit forward, rearward and leveling adjustment of brackets 37 and 38.

An adjustable channel-shaped mounting bracket 41 extends between fixed brackets 37 and 38 (FIG. 7) and is adjustably supported thereon by bolts 42 extending through slots 43 in member 41. Bracket 41 may be adjusted for height and also for tilting by screws 44 (FIGS. 7 and 8) engaging flanges 45 at the top edges of brackets 37 and 38.

A simple standard portable TV camera unit 46 may be mounted by usual thumbscrew means 47 on adjustable bracket 41. Camera 46 may have a plug-in connection 48 with power supply socket 49. Thus, when camera repairs are required, camera 46 may be unplugged and replaced by another camera simply by separating the thumbscrew connection 47.

The lens 50 of camera 46 projects upwardly and extends through a hole 51 formed in plate 35. A pair of brackets 52 are mounted on side panels 23 within cabinet 1 spaced below top wall 7 and above plate 35. A slidable shelf or platform 53 is removably supported on brackets 52 and normally is held in assembled position by spring clips 54 mounted at the rear ends of brackets 52 (FIG. 5).

Platform 53 has a downturned front flange 55, secured by wingnuts 56 to inturned ears 57 projecting from the front ends of brackets 52 normally to maintain the shelf 53 assembled in the fixed position shown in full lines in FIGS. 4 and 5. When wingnuts 56 are removed, shelf 53 may slide, drawerlike, out of cabinet 1, as shown in dot-dash lines at 58 in FIG. 5.

Platform 53 is formed with an opening 59 preferably rectangular in shape. Protective shield sidewalls, each having a portion 60 extending upwardly from an end of opening 59 and an outwardly angled portion 61 extending to a line adjacent one of sidewalls 23, are welded by flanges 62 and 63 to platform 53. Shields 60 and 61 extend upwardly to a zone spaced from the underside of top wall 7. A front glass retainer 64 having a downturned front flange 65 is spotwelded to platform 53 and extends inward from the front edge of the platform 53 at each side along the shield portions 61 to form a shoulder 66. Upturned ears 67 at the front end of front retainer 64 form grooves along the front flange 65 to receive and support a downturned flange 68 at the upper edge of a front access closure panel 69 for the front of the cabinet 1 below platform 53. The lower end of panel 69 has a downwardly opening groove 70 formed in a flange 71 to engage over flange 72 of stretcher 31 to releasably hold the access panel 69 assembled to cabinet 1.

A rear glass retainer 73 formed with a rearwardly projecting top flange 74, a vertical shield wall 75, a rearwardly projecting lower shield wall 76 and a shoulder 77 is bolted at 78 to platform 53 (FIGS. 5 and 10). Rear glass retainer 73 extends laterally between shield walls 60 thus forming an enclosed recess or compartment within cabinet 1 above platform 53. A glass shelf or window 79 is supported on platform 53 over opening 59 held in position by front glass retainer shoulder 66 and the rear glass retainer shoulder 77. A gasket 80 is provided between the rear edge of glass shelf 79 and glass retainer shoulder 77 (FIG. 10).

Glass window 79 thus extends over the opening 59 in platform 53 and is located generally centrally above lens 50 of camera 46 (FIGS. 4 and 5). A television picture can be taken by the camera 46 of anything supported on glass shelf 79.

A Z-shaped angle member 81 is mounted on the underside of cabinet top wall 7 (FIG. 4) having a flange adapted to underlie top flange 74 of rear glass retainer 73 when platform 53 is in assembled position within cabinet 1 as illustrated in FIG. 4. Thus, access to the interior of the cabinet below top wall 7 and behind rear glass retainer shield wall 75 is prevented or shielded by the various shield and retainer members 60, 61 and 73.

Normally, front retainer 64 is maintained properly spaced above platform 53 by a pair of dimples 82 drawn upwardly in platform member 53 at the front of opening 59 (FIGS. 4 and 5).

An angular bracket 83 has a bottom leg 84 bolted at 85 to the rear of platform 53 and extends upwardly of platform 53. A solenoid 86 is mounted at the upper end of bracket 83 to the rear of rear retainer shield wall 75. A U-shaped bracket 87 is mounted on bracket 83 below solenoid 86 to hold approval stamp member 88 aligned below solenoid 86. Member 88 is normally spring pressed to the upper position shown by spring 89. Approval stamp plunger 88 is formed with a flexible cap member 90 at its lower end enclosing a replaceable preferably self-inking stamp member 91 (FIG. 13) within a cup-shaped recess 92. The wall of cup 92 flexes at 93 between the normal position of FIG. 11 and the stamping position of FIG. 13 so as to permit approval stamp 91 to engage a document held on the upper surface of glass 79 (indicated by the dot-dash line 94 in FIG. 13) when the approval stamp plunger 88 is driven downward by solenoid 86. The cap member 90 moves downward through an opening 95 in shield wall 76 of rear glass retainer 73 when actuated by the solenoid 86.

The self-inking stamp member 91 preferably is readily removable from a retaining cup 96 within the flexible cup 92 of the stamping device in order to permit removal of stamp 91 for changing it from time to time to renew it or to reduce the possibility of improper or surreptitious use of an unauthorized stamp.

Lighting fixtures 97 may be mounted on brackets 52 each including a reflector 98 and a light bulb 99 for illuminating an object resting on window 79 with sufficient light for exposure of camera 46.

Shelf 35 acts as a light shield to inhibit reflection within the cabinet which would prevent efficient television photography by camera 46 of an object resting on glass window 79.

The interior cabinet walls and particularly the upper surface of shelf 35 and the undersurface of platform 53 preferably are painted black to inhibit reflection within the cabinet of light from fixtures 97.

Lights 97 may be supplied with power through wires 100 leading from power supply socket 49. Power sockets 49 as well as electromagnet 86 may be supplied with power from any suitable source through a line 101 and an external plug 102.

Suitable TV cable connection may be made through cable connector 103 and cable 104. The closed-circuit TV cable for the particular cabinet 1 to which cable 104 is connected, is indicated at 3 in FIG. 1; and suitable wiring also connects the power button 8, the veto signal light 9 and the file clerk selector buttons 10 of control box 6 and junction box 5.

OPERATION AND USE OF THE EQUIPMENT AND SYSTEM

It is contemplated that the improved equipment when installed in a large bank may involve a number of cabinets 1 located at a plurality of teller stations and a number of monitors 2 located at a plurality of file clerk terminal stations. However, there may be only one or two file clerk stations and a number of teller stations, and the reverse situation also may exist.

A teller in the usual course of business may be requested to cash a check for a customer not known to the teller. In order to verify the check signature, the teller takes the check to the teller station cabinet 1 and inserts it, face down over the glass window 79 so that a portion of the check slips beneath rear glass retainer protective wall 76 and thus beneath opening 95 and approval stamp 91. The teller presses power button 8 (FIG. 3) to energize cabinet 1 and then presses one of the file clerk selector buttons 10, for example, the button for the file clerk having charge of the A through G account cards, in order to identifying the customer "John Doe."

Actuation of the selector button 10 through usual switching equipment in junction box 5 connects the teller's cabinet 1 with the file clerk terminal 2 handling the A through G accounts. At this time the teller station indicator 17 for the particular teller is lighted, thus identifying the calling teller. At the same time, an audible signal is given at 18 to attract the attention of the file clerk.

The file clerk then moves to monitor 2 and depresses the power button 14 to energize his terminal 2. He also actuates the particular button 17 which has been lighted by the teller's call, to connect the TV monitor in terminal 2 with the camera 46 at the calling teller's station. A picture of the check or signature which the teller desires to have verified thus is displayed at the TV receiver screen 12. The file clerk then goes to the file of signature cards and removes the signature card for the particular customer, "John Doe," and then compares the signature on the signature card with that displayed at the screen 12.

Responsibility for verifying the signature rests upon the file clerk. If he verifies the signature as being correct, he then actuates approval button 15 which in turn actuates solenoid 86 at the teller stations to stamp a check resting on window 79 with the approval stamp 91. Actuation of approval button 15 also breaks the connection between the file clerk terminal 2 and the cabinet 1 of the calling teller, to reset the system so that the file clerk can receive another call from some teller.

If the file clerk does not verify the signature or is suspicious thereof, he actuates veto button 16 which lights the veto signal light 9 at the teller station indicating the veto. This permits the teller to handle the situation of lack of verification in the most advantageous manner. There has been no audible signal of the veto, and no phone conversation, etc. has taken place which heretofore has characterized the verification or veto procedures when the verifying operation has been performed by the teller.

The lock means 19 for the approval button 15 is provided so that the file clerk terminal equipment 2 may only be actuated, for signature approval, by an authorized employee having a key to the keylock 19.

The arrangement of the camera, light shield 35, lighting fixtures and glass window 79, and the adjustments thereof may be in accordance with the structure shown in the application of Walter G. Anders, Ser. No. 657,529 filed Oct. 16, 1967 now U.S. Pat. No. 3,541,256.

The improved equipment and system is very compact in construction, is easy to use, and is relatively inexpensive since it can incorporate standard simple portable TV camera and receiver components without requiring complicated circuitry and controls. The improved equipment and system also is very flexible since it can accommodate any desired number of teller stations and file clerk stations. Thus, the improved construction provides effective equipment for rapid signature verification in conducting banking services with responsibility for verification resting upon the file clerk who has charge of and is familiar with the signature cards.

This concepts eliminates difficulties and problems that have existed and thus achieves the objectives and solves problems existing in the art in a simple and inexpensive manner.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact details or to the particular make or type of components shown or described.

Having now described the features, discoveries and principles of the invention, the manner in which the improved equipment is made, assembled and used, the manner in which the system may be operated, and the characteristics of the equipment and system; the advantageous, new and useful structures, devices, elements, arrangements, parts, combinations and subcombinations are set forth in the appended claims.

We claim:

1. Signature authorization and verification equipment including a teller station cabinet-housed television camera transmitter and control unit, and a file clerk station television terminal receiver and control unit; the teller station unit including a cabinet having a horizontally disposed transparent window therein provided with an upper document-supporting surface and an undersurface, vertically disposed television camera means within the cabinet below said window directed toward and spaced from said window under surface, window illumination means within the cabinet below said window, approval stamp means above said window adapted to stamp the top surface of an object-supported face down on the window document-supporting surface and viewed by said camera means, means enclosing the stamp means above said window against unauthorized access, and veto signal means; the file station unit including a television monitor receiver, approval stamp actuator means, and veto signal actuator means, and circuitry connecting the television transmitter and receiver and the approval stamp and veto signal means and their actuator means.

2. The construction defined in claim 1 in which the camera means is adjustably and removably mounted within the cabinet.

3. The construction defined in claim 1 in which the veto means includes an inaudible visual signal.

4. The construction defined in claim 1 in which the enclosing means is formed with an opening above the window document-supporting surface, and in which the stamp means has a stamp member that moves through said opening when the stamp means is actuated.

5. The construction defined in claim 4 in which the stamp means is mounted within the cabinet, and in which the stamp member is moved by solenoid means.

6. The construction defined in claim 5 in which there is adjustable means removably mounting the stamp means within the cabinet, and in which the stamp member is removably mounted the stamp means.

7. Signature authorization and verification equipment including a plurality of teller station cabinet-housed television camera transmitter and control units, and a plurality of file clerk station television terminal receiver and control units; each teller station unit including a cabinet having a horizontally disposed transparent window therein provided with an upper document-supporting surface and an undersurface, vertically disposed television camera means within the cabinet below said window directed toward and spaced from said window undersurface, window illumination means within the cabinet below said window, approval stamp means above said window adapted to stamp the top surface of an object supported face down on the window document-supporting surface and viewed by said camera means, means enclosing the stamp means against unauthorized access, veto signal means, and a series of file station selector members one for each file station unit; each file station unit including a television monitor receiver, approval stamp actuator means, veto signal actuator means, and a teller station identifying and connector device; and circuitry including junction box switching means for connecting the camera of one teller station unit with a selected file station television monitor receiver, for connecting a file station selector member at said one teller station and a teller station identifying and connector device at said selected file station, and for connecting the approval stamp and veto signal means at said one teller station and the approval stamp and veto signal means actuator means at said selected file station; whereby actuation of one of the selector members at said one teller station connects its camera with the receiver at said selected file station, and connects such selector member with the corresponding teller station identifying and connector device at said selected file station, and connects the approval stamp and veto signal means at said one teller station and their actuator means at said selected file station.

8. The construction defined in claim 7 in which each file station unit has lock means for its approval stamp actuator means.

9. The construction defined in claim 7 in which each teller station unit has power switch means for energizing such teller station unit connected circuitry, and in which each file station unit has power switch means for energizing its receiver.

10. The construction defined in claim 9 in which each file station unit has audible signal means energized by actuation of a corresponding file station selector member at any teller station unit.

11. Signature authorization and verification equipment including a teller station cabinet-housed television camera transmitter and control unit, and a file clerk station television terminal receiver and control unit; the teller station unit including a cabinet having a top counter, a horizontally disposed transparent document supporting window within the cabinet spaced below the top counter and provided with an upper document-supporting surface and an undersurface, vertically disposed television camera means within the cabinet directed toward and spaced below a window undersurface, illumination means within the cabinet below the window, approval stamp means within the cabinet above the window, protective means above said window enclosing the stamp means against access through the space between the top counter and window, and veto signal means; the file station unit including a television monitor receiver, approval stamp means actuator means, and veto signal means actuator means; and circuitry connecting the television transmitter and receiver and the approval stamp and veto signal means and their actuator means.

12. The construction defined in claim 11 in which the protective means includes shield members extending between the window and top counter forming a compartment within the cabinet open at the front for access to the window.

13. The construction defined in claim 11 in which the transparent window is mounted on a removable platform within the cabinet, and in which the approval stamp means and protective means are mounted on said removable platform.

14. The construction defined in claim 11 in which the stamp means and camera means each is adjustably mounted within the cabinet.

15. The construction defined in claim 11 in which lock means is provided for the approval stamp means actuator means.

16. The construction defined in claim 11 in which the file station unit has audible signal means.

17. The construction defined in claim 11 in which the veto signal means includes an inaudible visual signal.

18. The construction defined in claim 11 in which the teller station unit includes a power switch for energizing the teller station unit connected circuitry, and in which the teller station unit is provided with a series of file station selector members.

19. The construction defined in claim 11 in which the file station unit includes a power switch for energizing its receiver, teller station identifying and connector device means, audible signal means, and lock means for the approval stamp means actuator means.

20 In signature authorization and verification equipment for use in closed-circuit television systems in banking institutions, a teller station cabinet-housed television camera transmitter and control unit including a cabinet having a horizontally disposed transparent window therein provided with an upper document-supporting surface and an undersurface, vertically disposed television camera means within the cabinet below said window directed toward and spaced from said window undersurface, window illumination means within the cabinet below said window, approval stamp means above said window adapted to stamp the top surface of an object supported face down on the window document-supporting surface and viewed by said camera means, and means located remotely with respect to said approval stamp means for actuating said approval stamp means.

21. The construction defined in claim 20 in which the unit includes veto signal means, and means located remotely with respect to said veto signal means for actuating said veto signal means.

22. The construction defined in claim 20 in which a plurality of remotely located file station television monitor receivers are provided in the closed-circuit television system, and in which a series of file station selector members are provided in the unit one for each file station monitor receiver selectively operable to connect the unit to a selected receiver.

23. The construction defined in claim 20 in which a plurality of remotely located file station television monitor receivers are provided in the closed-circuit television system, in which the unit includes a control device, and in which the control device includes power switch means for energizing the unit, veto signal means, and a series of file station selector members adapted to be actuated selectively to connect said camera transmitter with one of the plurality of remotely located television monitor receivers.